US009038173B2

(12) United States Patent
Chen et al.

(10) Patent No.: US 9,038,173 B2
(45) Date of Patent: *May 19, 2015

(54) SYSTEM AND METHOD FOR PROVIDING NETWORK SECURITY

(75) Inventors: Zesen Chen, Pleasanton, CA (US);
Yongdong Zhao, Pleasanton, CA (US);
Peter Chou, San Ramon, CA (US);
Brian A. Gonsalves, Antioch, CA (US);
Michael Taylor, Brentwood, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,771

(22) Filed: Sep. 6, 2012

(65) Prior Publication Data

US 2013/0014255 A1    Jan. 10, 2013

Related U.S. Application Data

(63) Continuation of application No. 12/895,272, filed on Sep. 30, 2010, now Pat. No. 8,286,242, which is a continuation of application No. 11/200,249, filed on Aug. 9, 2005, now Pat. No. 7,832,006.

(51) Int. Cl.
*H04L 29/06* (2006.01)

(52) U.S. Cl.
CPC ............ *H04L 63/20* (2013.01); *H04L 63/1408* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 4,721,945 A | 1/1988 | Maki et al. | |
| 5,276,444 A | 1/1994 | McNair et al. | |
| 6,035,405 A | 3/2000 | Gage et al. | |
| 6,604,198 B1 | 8/2003 | Beckman et al. | |
| 7,171,690 B2 | 1/2007 | Kouznetsov et al. | |
| 7,246,156 B2 * | 7/2007 | Ginter et al. | ................. 709/217 |
| 7,472,422 B1 | 12/2008 | Agbabian | |
| 7,823,147 B2 | 10/2010 | Moshir et al. | |
| 7,832,006 B2 | 11/2010 | Chen et al. | |
| 8,046,835 B2 * | 10/2011 | Herz | ............................. 726/25 |
| 2002/0066035 A1 | 5/2002 | Dapp | |
| 2003/0051026 A1 | 3/2003 | Carter et al. | |

(Continued)

OTHER PUBLICATIONS

"Global Management System Product Overview," SonicWALL GMS Internet Security: Management, Firewall, VPN, Centralized Reporting, May 2005.

(Continued)

*Primary Examiner* — Izunna Okeke
*Assistant Examiner* — Abdulhakim Nobahar
(74) *Attorney, Agent, or Firm* — Toler Law Group, PC

(57) ABSTRACT

A method includes receiving an indication of at least one detected security issue at a network device. The indication is received at a security manager processor from a security agent. The method includes selecting, via the security manager processor, at least one executable security object responsive to the indication. The security manager processor verifies compatibility between the at least one executable security object, the network device, and communication media. The method also includes sending the at least one executable security object to the network device via the security manager processor to provide a protective security measure to the network device against the at least one detected security issue upon execution of the at least one executable security object.

20 Claims, 2 Drawing Sheets

(56) References Cited

U.S. PATENT DOCUMENTS

| | | | |
|---|---|---|---|
| 2003/0149897 A1* | 8/2003 | Ylitalo et al. | 713/201 |
| 2004/0111638 A1 | 6/2004 | Yadav et al. | |
| 2004/0128543 A1* | 7/2004 | Blake et al. | 713/201 |
| 2004/0260818 A1 | 12/2004 | Valois et al. | |
| 2005/0050377 A1* | 3/2005 | Chan et al. | 714/4 |
| 2005/0125687 A1 | 6/2005 | Townsend et al. | |
| 2005/0260996 A1 | 11/2005 | Groenendaal | |
| 2005/0267928 A1 | 12/2005 | Anderson et al. | |
| 2006/0083408 A1* | 4/2006 | Hoffman et al. | 382/115 |
| 2006/0095961 A1* | 5/2006 | Govindarajan et al. | 726/15 |
| 2006/0156380 A1 | 7/2006 | Gladstone et al. | |
| 2006/0197702 A1 | 9/2006 | Jones | |
| 2007/0070213 A1 | 3/2007 | Tedesco et al. | |
| 2009/0205039 A1 | 8/2009 | Ormazabal et al. | |
| 2011/0078792 A1 | 3/2011 | Chen et al. | |

OTHER PUBLICATIONS

"Sygate Security Enterprise—Award-Winning Centrally Managed Personal Firewalls," Sygate Products Overview, May 2005.

Applications: Voice over IP, Network Protection, Site-to-Site VPN, Remote Access VPN, Technologies, SonicWALL Products Overview, May 2005.

Non-Final Office Action for U.S. Appl. No. 12/895,272 mailed Jul. 12, 2011, 29 pages.

Non-Final Office Action for U.S. Appl. No. 12/895,272 mailed Dec. 27, 2011, 25 pages.

Notice of Allowance for U.S. Appl. No. 12/895,272 mailed Jun. 6, 2012, 22 pages.

* cited by examiner

SYSTEM AND METHOD FOR PROVIDING NETWORK SECURITY

CLAIM OF PRIORITY

This application is a continuation of, and claims priority from, U.S. patent application Ser. No. 12/895,272, filed on Sep. 30, 2010, now issued as U.S. Pat. No. 8,286,242, which is a continuation of U.S. patent application Ser. No. 11/200,249, filed on Aug. 9, 2005, now issued as U.S. Pat. No. 7,832,006, both of which are hereby incorporated by reference in their entireties.

FIELD OF THE DISCLOSURE

The present disclosure relates generally to security for network-based communications and more particularly to a system and method of providing network security for communications over a public communications network.

BACKGROUND

Security features and devices have become an important part of communication networks. Worms, viruses, and spyware are examples of security threats that can render network devices inoperable and/or allow hackers or criminals to steal sensitive information. Without adequate corporate network security, hackers can steal trade secrets and confidential data from a corporation. Without security on a residential system hackers can perpetrate identity theft or destroy personal data. Many security features and devices are currently available for addressing such problems, however, managing network security problems are difficult because threats are always changing and systems are generally very complex. For example, virus prevention software that is purchased today will likely fail to protect a user from threats occurring in the months to come due to newly emerging viruses. Certain network transactions, such as browsing the Internet, do not require a significant amount of security while other transactions, such as transmitting business plans and technical discoveries between computers, can warrant substantial security measures. It is preferable to provide or implement security measures that are current and are commensurate with existing security threats. Millions of computers are connected to networks. Implementing and maintaining adequate security measures on all network devices is a formidable task. Accordingly, it would be advantageous to efficiently implement up-to-date security features responsive to security vulnerabilities.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Figure 1:
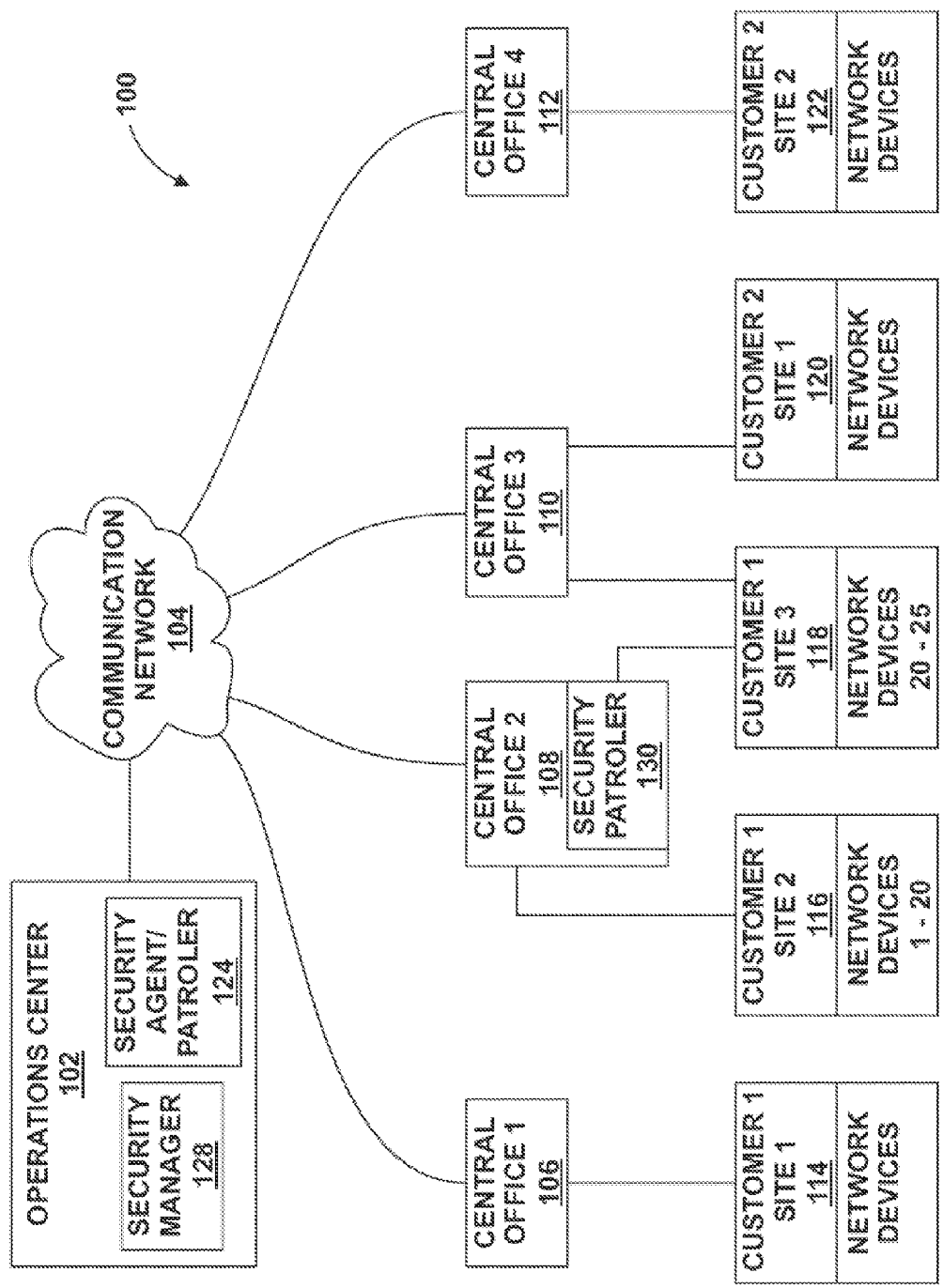
FIG. 1 is an illustrative embodiment of a communications network that can provide communication security features.

Administration of network security or communication security is an expensive and demanding undertaking. Network security is typically implemented in a fragmented manner because of user preferences, available software, changing threats, and different philosophies about how to provide such security. Generally, security breaches or security threats are addressed by information technology (IT) personnel hired by businesses, service providers or individual computer owners.

These trained IT employees often manually monitor networks and update software on individual network devices such as personnel computers responsive to problems that occur. This reactionary and manual form of security typically requires the presence of the IT individual at each network device to implement and update security features. Often, security features are implemented only after problems costing thousands of dollars in lost productivity are diagnosed.

When a new threat arises and improved software is available, the IT personal may again be required to visit each network device and individually load the improved software on the network devices. Large and small businesses alike are challenged by implementing and tracking the security features that are operational on a network.

Additionally, operational feedback from a communication network security system and an inventory of installed software is generally unavailable to the IT personnel. Accordingly, current security systems and security features do not provide comprehensive solutions that perform in a cohesive manner. Further, maintaining such security systems is an expensive and inefficient process.

In one embodiment of the present disclosure a security system is implemented utilizing a centralized, proactive security monitoring and near real-time maintenance process. The system can utilize a set of rules to monitor security, detect security threats and address security concerns from a central location based on detected activity. In another embodiment, network devices such as personal computers can initiate a request for a security feature from the central location.

After the security issue is identified, executable security objects or software components can be selected at the centralized location, transmitted over the communication system and loaded by the remotely located network devices. The executable security objects can provide security features such as a virtual private network connection, a firewall, intrusion detection, content filtering, anti-virus protection, anti-worm protection, spyware protection, pop-up blocking, spam filtering, intrusion prevention, secure socket layer protection, digital rights management, wireless application protocol and other secure communication features.

In an embodiment, a method includes receiving an indication of at least one detected security issue at a network device. The indication is received from a security agent at a security manager processor. The method includes polling, via the security manager processor, at least one other network device in response to the indication in order to retrieve additional information when the security manager processor determines that the additional information is needed. The method includes selecting, via the security manager processor, at least one executable security object responsive to the indication and the additional information. The method also includes initiating communication of the at least one executable security object to the network device via the security manager processor.

In an embodiment, a system includes at least one processor and a memory coupled to the at least one processor. The memory includes instructions that, when executed by the at least one processor, cause the at least one processor to receive an indication from a security agent of a detected security issue at a network device. The memory includes instructions that, when executed by the at least one processor, cause the at least one processor to poll at least one other network device in response to the indication when the at least one processor determines that additional information is needed pertaining to the detected security issue. The memory also includes instructions that, when executed by the at least one processor, cause the at least one processor to provide at least one security feature to the network device responsive to the indication and the additional information.

In an embodiment, a non-transient computer readable medium embodies instructions executable by a processor. The instructions are executable by the processor to receive an indication of at least one detected security issue at a network device. The instructions are executable by the processor to determine that additional information related to the at least one detected security issue is needed. The instructions are executable by the processor to poll at least one other network device in response to the indication in order to retrieve the additional information. The instructions are executable by the processor to select at least one executable security object responsive to the indication. The instructions are also executable by the processor to initiate communication of the at least one executable security object to the network device.

In FIG. 1 an exemplary network-based security system 100 is provided. In the illustrative embodiment security manager 128 and first security agent/patroller 124 operate from an operations center 102 of a telecommunications provider. However, the security manager 128 and the security agent 124 can be located anywhere network access is possible. For example, a second security patroller 130 is illustrated as operating from a second central office 108. The operation center 102 may be directly coupled to a communications network 104.

Communication network 104 may be coupled to first central office 106, second central office 108, third central office 110 and fourth central office 112. Each central office may be coupled to a customer site such as first customer first site (FCFS) 114, first customer second site (FCSS) 116, first customer third site (FCTS) 118, second customer first site (SCFS) 20, and second customer second site (SCSS) 122.

Each of the customer sites may have smaller self-contained communication networks such as a local area network (LAN) and operational network devices such as servers, routers switches and computers that communicate with other computers. The servers and routers at the customer sites may also communicate with other network devices on other LANs at other customer sites via the communications network 104. Although only a single operations center 102, four central offices 106-112 and five customer sites 114-122 are illustrated, the embodiment illustrate is merely exemplary, as any number of centers offices and/or sites could be provided with security management utilizing the present teaching.

In one configuration there are multiple security agents 124 for each security manager 128. For example, a security agent 124 may be located at each customer site or a central office and multiple security agents can report to a single security manager at an operations center.

FCFS 114 may be located in one metropolitan area and FCSS 116 may be located in another metropolitan area thousands of miles away. FCTS 118 may be coupled to two different central offices (i.e. 108 and 110) such that in case of a failure an alternate communication path could be utilized. Providing network security management over such a vast network for even one customer can be a complicated task. Very large companies having thousands of computers coupled to dozens of central offices and hundreds of LANs face even bigger challenges.

In large wide area networks that couple multiple LANs there are many access points that allow for security intrusions to occur. Assigning network devices to security agents and/or a security manager 128 that is centrally located can facilitate organization of security features and provide uniform control. For example, if a remote network device at FCFS 114 wants to securely communicate with a network device at FCTS 118, the security manager 128 can receive such a request and administrate a security feature by providing both network devices with a virtual private network executable security object. Thus, when the VPN becomes operational the network devices can securely communicate.

In one embodiment an executable security object can be considered as software package or product that can be loaded on to a network device or a data processing device and provide instructions that influence the operation of the data processing device. In another embodiment the executable security object can be a "patch" or a software update meant to fix problems and possibly operate in coordination with previously installed software. Executable security objects could facilitate many different security features such as intrusion detection and virus protection.

FIG. 1 illustrates one solution for managing corporate and individual network security by providing network-based security maintenance, detection and implementation. In one configuration the security management is provided in near real time with up-to-date tools and software that can be auto-installed utilizing the communication network 104 to transport the executable security objects. These automated security features can keep a communication network secure with the latest technology while greatly reducing the need for human presence.

In accordance with the present disclosure, a security agent 124 may be present at central offices and act as a patroller and monitor customer sites, network devices and major communication system components. Further, the security agent 124 can address network device requests and notify the security manager 128 of security deficiencies and security breaches. In response, the security manager 128 can specify a remedy, including creation of a security profile that identifies network devices and executable objects or software that can address and thwart the security issue.

The security manager 128 may act as an administrator undertaking many functions. For example, security agent 124 may identify a newly connected network device as an intruder or as authorized but deficient in security features. Security agent 124 may also identify a transmission as an unsecured communication that should be provided with a security feature. Further, the security agent 124 can pose as an intruder, a hacker or an eavesdropper and test system security. These proactive and reactive measures and counter measures can be performed for newly connected devices and for devices that have been operating in the network for long periods of time.

In one implementation the security agent 124 can be present at central offices and administrate, facilitate or manage the implementation of the security features for network devices coupled to the central office. When a network device requests a security feature such as a virtual private network, when a network device has a security related problem, or when the security agent detects a problem, the results of the detection can be sent via the security agent 124 to the security manager 128 at a centralized location such as an operations center.

The security agent 124 may also provide the security manager 128 with periodic network status information. The security manager 128 can then utilize the network status information to see if security is current and to diagnose problems and select remedies. Alternately, a human operator can access information via the security manager 128 and/or the security manager 128 may notify a human operator via e-mail or a communication device when a security issue arises.

The security feature or remedy may be supplied in the form of an executable security object stored by the security manager 128 and identified as a solution to a specific problem or specific phenomena. When additional information can help the security manager 128 the security manager 128 may poll network devices. In one embodiment, the security manager 128 can poll the security agents 124 for network device ID's, physical locations of network devices, software configurations and other information to provide a more detailed overview of the system and possibly quarantine aberrant network devices.

The security agent 124 or the security manager 128 may store an inventory of the types of network devices located at the customer sites and the status, model number, software status and capabilities of such devices. Likewise, the security agent 124 and the security manager 128 may store the types of network devices located at the central offices 106-122 and the status, model number and capabilities of the network devices located at central offices.

The security manager 128 may select executable security objects for transmission to the network devices based on the stored data and may utilize a look up table to identify executable security objects that can address specific security issues for specific network devices. The security manager 128 may also store, or be able to determine or verify what improved security features are available from suppliers (possibly from a subscription service) by comparing revision numbers and an importance level of a new software release. In addition the security manager 128 can determine if the updated security features can be installed on the deficient network device.

If it is determined that network security is substandard (for example there is a network alert from a software vendor such as Microsoft) and a new version of software is required for a new threat, the security manager 128 can transmit software patches or entire software programs to the appropriate network devices. The security agents 124 may receive multiple software objects or executable components bundled in a package and parse the package into components and transmit the components to the appropriate customer site/network devices. For example, when FCSS 116 needs a secure socket layer or a digital rights management security feature with FCFS 114, a client software object may be sent to FCFS 114 and server software object may be sent to FCSS 116. A client device resident at the FCFS 114 may provide an acknowledgement, or a return receipt to the security manager 128 and a server at FCSS 116 may also acknowledge receipt of the executable security object.

When the security feature is established between FCFS 114 and FCSS 116 the network devices can also send an acknowledgment to the security agent 124 that security feature is operating. This feedback can occur with all types of security feature implementations. Thus, the security agent 124 can notify the security manager 128 that there has been successful implementation of a security features.

In one embodiment, a security profile may contain executable security objects organized by device type then protection type. For example, many executable objects can be available for, and stored in, a file for a personal computer. When the personal computer has a security concern, encounters a security breach or security problems, the security profile can be parsed to solve a detected problem.

In one configuration, security engines can be resident on network devices and the security manager 128 can be resident at a central location. The security manager 128 can store parameters of the security engine, such as operational features provided by its software, a physical location, a network address, a model number, a serial number, a device type identifier, a device capability, a device feature, a security status, a security level, and a software revision indicator. In another configuration the security manager 128 stores known problems creating known phenomena and relates the phenomena to executable security objects that when implemented can remedy the problem. Thus, executable security objects can be selected by the security manager 128 based on many different criteria.

The network based security system can include the security manager 128 that receives a signal from the security agent 124 or patroller. The security agent 124 can detect security issues and communicate an alarm to the security manager 128 via the communication network 104. The security agent 124 can detect either a request for operational security from a network device or determine that security is needed based on the intrusions, pop-ups, spam, the existence of "naked" data transmitted by a device and/or aberrant operation of a network device. Further, the security agent 124 can send a signal to the security manager 128 indicating that security has fallen below a predetermined level.

The security manager 128 may also administrate the implementation of network security features upon receipt of information from the security agent 124. The security manager 128 or the security agent 124 can track the security level of the system and verify that a security feature has been received and implemented. Thus, the implementation of security features may include verifying security feature availability in a security profile package, parsing the security service profile into a configuration useable by specific security devices, ensuring compatibility between security routines, devices and communication media, acknowledging receipt of security features, notifying the security manager of an implementation.

The security manger 128, security agent 124 and security patroller 130 and can include at least one processor having memory that may store instructions that may be utilized to store and retrieve software programs incorporating code that implements the present teaching. Additional data storage can provide a computer readable storage media for providing such security features.

Figure 2:
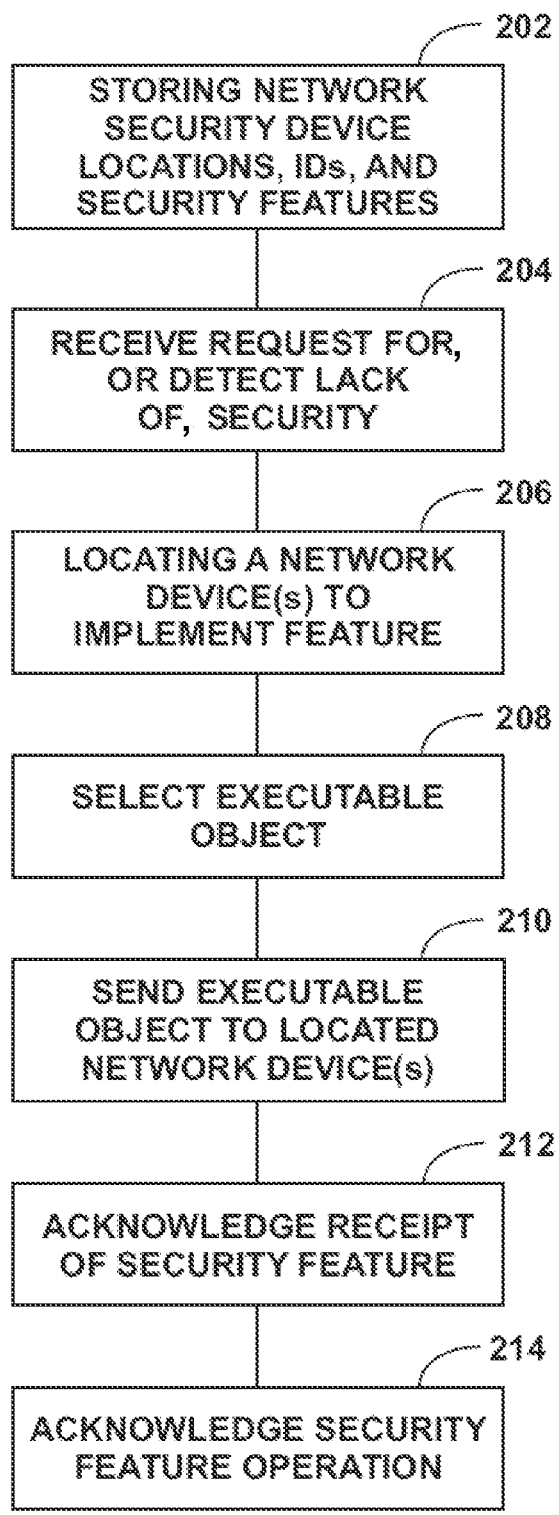
FIG. 2 is a flow diagram that illustrates a method of providing network security for a communication system.

In FIG. 2 an exemplary method of providing centralized network security is provided. At 202, a network security manager can store executable security objects that may be associated with specific security threats or specific requests from network devices.

A request can be received from a network device, or a lack of network security can be detected, at 204. Network devices can be identified that can implement a specific security feature, at 206, and an executable object to provide such security feature can be selected, at 208. The executable object can be sent to the identified security device, at 210. After receipt of the executable objects, the identified security device can acknowledge receipt of the security feature, at 212. As the executable object is executed and the security feature is in operation, acknowledgement of such procedure can be provided, at 214.

In accordance with the teachings herein, the centralized security system provides a scalable network that can be utilized by small business with a minimal number of users or large businesses with hundreds of thousands of users. The centralize security system can be deployed in a short amount of time and does not require individuals to visit the customer sites and service hundreds of computers in order to maintain network security. A majority of the security feature implementation taught herein can be automated by security agents and a security manager. The present system may also result in a lower total cost of security for businesses and security providers.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   receiving an indication of a detected security issue at a network device, wherein the indication is received at a security manager processor from a security agent posing as a network intruder to detect a security issue at the network device, and wherein the indication is received in response to detection of the detected security issue by the security agent;
   selecting, via the security manager processor, an executable security object responsive to the indication, wherein the security manager processor verifies compatibility between the executable security object and the network device;
   verifying availability of the executable security object in a security service profile package; and
   sending the executable security object to the network device via the security manager processor to provide a protective security measure to the network device against the detected security issue upon execution of the executable security object.

2. The method of claim 1, further comprising:
   receiving network status information from the security agent; and
   determining whether network security is updated based on the network status information.

3. The method of claim 2, wherein the security manager processor is configured to diagnose a problem based on the network status information.

4. The method of claim 3, wherein the security manager processor is configured to determine a remedy to the problem based on the network status information.

5. The method of claim 1, wherein the executable security object comprises a software update to operate in coordination with installed software of the network device.

6. The method of claim 1, further comprising:
   detecting the network device being newly connected to a network managed by the security manager processor; and
   determining whether the network device is authorized to access the network.

7. The method of claim 1, wherein the executable security object is executable at the network device to establish a virtual private network connection between the security manager processor and the network device, intrusion detection software, a firewall, secure socket layer protection, or a combination thereof.

8. The method of claim 1, wherein the security agent is located at an operation center that is remote from the network device, and wherein the operation center is coupled to the network device via a communication network.

9. The method of claim 1, further comprising updating the executable security object based on a comparison of revision numbers associated with the executable security object, an importance level of an updated release, or a combination thereof.

10. The method of claim 1, further comprising:
    parsing the security service profile package into a configuration usable by the network device; and
    determining compatibility between the executable security object and the network device.

11. A system, comprising:
    a processor;
    a memory coupled to the processor, the memory including instructions that, when executed by the processor, cause the processor to perform operations including:
      receiving an indication of a detected security issue at a network device, wherein the indication is received from a security agent posing as a hacker to detect a security issue at the network device, and wherein the indication is received as a result of a test of security of the network device by the security agent;
      selecting a protective security feature responsive to the indication, wherein the processor verifies compatibility between the protective security feature and the network device;
      verifying availability of the protective security feature in a security service profile package; and
      sending a protective security object associated with the protective security feature to the network device to provide protection to the network device against the security issue upon implementation of the protective security feature by the network device.

12. The system of claim 11, wherein the operations further include determining whether to quarantine an aberrant network device based on intrusions, pop-ups, spam, existence of unsecured data transmissions, or a combination thereof, associated with the aberrant network device.

13. The system of claim 11, wherein the security agent administrates the implementation of the protective security object by tracking a security level of the network device and verifying that the protective security feature has been received and implemented by the network device.

14. The system of claim 11, wherein a first customer site is coupled to a first central office and a second customer site is coupled to a second central office, wherein the processor provides a particular security object to the first customer site and to the second customer site to enable secure communications between the first customer site and the second customer site.

15. A computer readable storage device storing instructions executable by a processor to perform operations comprising:
    receiving an indication of a detected security issue at a network device, wherein the indication is received from a security agent posing as an eavesdropper to detect a security issue at the network device, and wherein the indication is received in response to the network device failing to inhibit the security agent from obtaining eavesdropped information from the network device;

selecting an executable security object responsive to the indication, wherein the processor verifies compatibility between the executable security object and the network device;

verifying availability of the executable security object in a security service profile package; and sending the executable security object to the network device to provide a protective security measure to the network device against the detected security issue upon execution of the executable security object.

16. The computer readable storage device of claim 15, wherein the operations further comprise quarantining an aberrant network device, wherein the aberrant network device is identified based on intrusions, pop-ups, spam, existence of unsecured data transmissions, or a combination thereof, associated with the aberrant network device.

17. The computer readable storage device of claim 15, wherein the operations further comprise administrating execution of the executable security object.

18. The computer readable storage device of claim 15, wherein the operations further comprise determining a remedy to a problem based on network status information associated with a current operational status of the network device by:

receiving the network status information from the security agent; and determining whether network security is updated based on the network status information.

19. The computer readable storage device of claim 18, wherein the remedy includes updating the network security when the network security is not updated.

20. The computer readable storage device of claim 19, wherein the executable security object is executable at the network device to establish secure socket layer protection on the network device.

\* \* \* \* \*